(12) United States Patent
Bonfiglio (10) Patent No.: US 12,368,345 B2
(45) Date of Patent: Jul. 22, 2025

(54) TOROIDAL ELECTRIC GENERATOR

(71) Applicant: Infinity Electric Energy S.r.L., Milan (IT)

(72) Inventor: Ludovico Bonfiglio, Milan (IT)

(73) Assignee: Infinity Electric Energy S.R.L., Milan (IT)

( * ) Notice: Subject to any disclaimer, the term of this patent is extended or adjusted under 35 U.S.C. 154(b) by 130 days.

(21) Appl. No.: 18/273,335

(22) PCT Filed: Jan. 20, 2022

(86) PCT No.: PCT/EP2022/051265
§ 371 (c)(1),
(2) Date: Jul. 20, 2023

(87) PCT Pub. No.: WO2022/157258
PCT Pub. Date: Jul. 28, 2022

(65) Prior Publication Data
US 2024/0313617 A1 Sep. 19, 2024

(30) Foreign Application Priority Data
Jan. 21, 2021 (IT) .................. 102021000001004

(51) Int. Cl.
*H02K 7/18* (2006.01)
*H02K 1/2706* (2022.01)
(Continued)

(52) U.S. Cl.
CPC ......... *H02K 7/1807* (2013.01); *H02K 1/2706* (2013.01); *H02K 5/16* (2013.01);
(Continued)

(58) Field of Classification Search
CPC .... F01C 1/06; F01C 1/00; F03B 13/00; F03B 17/00; F03B 17/06; H02K 2201/12;
(Continued)

(56) References Cited

U.S. PATENT DOCUMENTS 3,859,789 A * 1/1975 Fawcett ................. H02K 44/00
418/33
5,334,899 A 8/1994 Skybyk
(Continued)

FOREIGN PATENT DOCUMENTS

| DE | 102006043343 A1 | 3/2008 |
|---|---|---|
| EP | 3494631 A1 | 6/2019 |
| FR | 3025950 A1 | 3/2016 |

OTHER PUBLICATIONS

International Search Report for corresponding application No. PCT/EP2022/051265, May 16, 2022, 5 pages.

*Primary Examiner* — Terrance L Kenerly
(74) *Attorney, Agent, or Firm* — Patterson Intellectual Property Law, PC (57) ABSTRACT

The invention relates to a toroidal electric generator (100) comprising a stator (20), which includes a tubular body (21) supporting a plurality of windings (24), and a rotor (30) rotatable within the stator (20) and comprising a support element (31) and a plurality of hydraulic blades (32), each provided with a respective magnet (34) and mounted on the support element (31) integral to it. The toroidal electric generator (100) further comprises an external casing (40) and a plurality of separating elements (51, 52), each separating element being arranged between a respective pair of adjacent windings (24) of the plurality of windings (24) of the stator (20).

14 Claims, 7 Drawing Sheets

(51) Int. Cl.
*H02K 5/16* (2006.01)
*H02K 5/22* (2006.01)

(52) U.S. Cl.
CPC ......... *H02K 5/225* (2013.01); *H02K 2201/12* (2013.01); *H02K 2205/09* (2013.01)

(58) Field of Classification Search
CPC ...... H02K 2201/09; H02K 5/225; H02K 5/16; H02K 1/2706; H02K 7/08; H02K 21/14; H02K 7/14; H02K 7/1823; H02K 7/1807; F05B 2250/141
See application file for complete search history.

(56) References Cited

U.S. PATENT DOCUMENTS

| | | | | |
|---|---|---|---|---|
| 5,347,186 A * | 9/1994 | Konotchick | ........... | H02K 35/04 |
| | | | | 322/3 |
| 9,583,993 B1 * | 2/2017 | Kaiser | .................... | F03B 13/00 |
| 2006/0226728 A1 * | 10/2006 | Pal | ....................... | H02K 7/1884 |
| | | | | 310/180 |
| 2013/0113216 A1 * | 5/2013 | Shrosbree | ................ | F03D 1/00 |
| | | | | 290/54 |

* cited by examiner

SECTION XIV-XIV

TOROIDAL ELECTRIC GENERATOR

TECHNICAL FIELD OF THE INVENTION

The present invention relates to the technical field of electric power generation devices. More particularly, the present invention relates to a toroidal electric generator for generating electric energy starting from a pressurized fluid, such as for example compressed air, compressed gas, water or pressurized steam.

Background of the Invention

A toroidal electric generator typically comprises a stator, which includes a toroidal tubular body, which supports one or more windings or coils of conductor wire, and a rotor rotatable inside the toroidal tubular body of the stator. The rotor comprises a plurality of hydraulic blades mounted on an annular support element, wherein each blade is provided with a respective magnet. The rotor is rotated inside the toroidal tubular body of the stator by a pressurized fluid entering the tubular body of the stator, so that the magnets of the hydraulic blades generate a magnetic field, which induces electric energy in the windings or coils of the stator.

A toroidal electric generator according to the prior art is disclosed, for example, in the patent EP 3 494 631 A1, in the name of the same applicant of the present application.

However, the toroidal electric generators according to the prior art have the drawback of generating dispersion phenomena of the magnetic field, which is produced by the magnets of the hydraulic blades which rotate in the toroidal tubular body of the stator.

SUMMARY OF THE INVENTION

The main object of the present invention is to provide a toroidal electric generator configured to have increased efficiency and to produce a greater quantity of electric energy.

Another object of the present invention is to provide a toroidal electric generator configured to withstand, without being damaged, external shocks and high pressures of the fluid entering the stator.

Still another object of the present invention is to provide a toroidal electric generator configured in such a way that it can be replaced in a short time, without interrupting the correct performance of work activities for a long time.

A further object of the present invention is to provide a toroidal electric generator which is simple in the maintenance or replacement of parts.

Another object of the present invention is to provide a toroidal electric generator configured to operate correctly while maintaining safety standards.

A further object of the present invention is to provide a toroidal electric generator configured to be compact and usable on any land, naval, air or space vehicle for the generation of electric energy on board of the same.

Yet another object of the present invention is to provide a toroidal electric generator configured to produce sufficient electricity to power batteries or storage systems, or electric motors and/or electric systems or lighting systems, for any home, building, industry, town or city.

A further object of the present invention is to provide a toroidal electric generator that is reversible, i.e. capable of operating as a compressor or a high-pressure pump, to feed storage systems, such as for example high-pressure cylinders or tanks for liquids.

Not least object of the present invention is to provide a toroidal electric generator which is substantially simple and reliable.

These and other objects, which will appear better below, are achieved by a toroidal electric generator according to independent claim 1. Other features of the present invention are also defined in the dependent claims 2 to 12.

The invention therefore relates to a toroidal electric generator comprising a stator, which includes a tubular body supporting a plurality of windings, and a rotor rotatable within the stator and comprising a support element and a plurality of hydraulic blades, each provided with a respective magnet and mounted on the support element integral to it.

The toroidal electric generator is characterized in that it further comprises an external casing and a plurality of separating elements, each separating element being arranged between a respective pair of adjacent windings of the plurality of windings of the stator.

The afore-mentioned combination of features, and in particular the presence of the external casing and of the plurality of separating elements between pairs of adjacent windings, allows to close the circuit of the magnetic flux generated by the magnets of the hydraulic blades as they pass inside each winding. This allows to eliminate or significantly reduce dispersion phenomena of the magnetic field generated by the magnets of the hydraulic blades of the rotor which rotates inside the stator, thus advantageously increasing the amount of electricity generated and the efficiency of the toroidal electric generator. Furthermore, the external casing advantageously allows the toroidal electric generator, in particular the stator windings, to be protected from external shocks and stresses.

BRIEF DESCRIPTION OF THE DRAWINGS

Further characteristics and advantages of the invention will become more evident from the description of preferred embodiments of a toroidal electric generator, illustrated by way of non-limiting example in the attached drawings, in which.

DETAILED DESCRIPTION OF PREFERRED EMBODIMENTS OF THE INVENTION

With reference to FIGS. 1 to 8, they show a toroidal electric generator according to a first preferred embodiment of the present invention.

The toroidal electric generator, indicated in general by the reference number 100, is configured to produce electrical energy starting from a pressurized fluid, such as for example compressed air, compressed gas, water or pressurized steam, and comprises a stator 20 and a rotor 30 rotatable inside the stator 20.

The stator 20 comprises a toroidal tubular body 21 on an external surface of which a plurality of windings or coils 24 of conductor wire is wound, for example a conductor wire made of high conductivity copper, preferably enameled or coated with insulating material. Preferably, a layer of insulating material (not shown) is present between the outer surface of the toroidal tubular body 21 of the stator 20 and the windings 24.

The toroidal tubular body 21 of the stator 20 consists of two semi-circular tubes, i.e. a first semi-circular tube 21a and a second semi-circular tube 21b.

The first and second semi-circular tubes 21a, 21b are joined together by means of two pairs of perforated flanges 22a, 22b, each pair of perforated flanges being welded at end portions of a respective semi-circular tube 21a, 21b. The perforated flanges 22a, 22b for coupling the first and second semi-circular tubes 21a, 21b are joined together by known means, for example by means of nuts, bolts and washers. Alternatively, the toroidal tubular body 21 of the stator 20 can be composed of a number of tubular portions other than two, for example three or four portions, coupled therebetween by means of respective perforated flanges.

The first and second semi-circular tubes 21a, 21b preferably have a circular or square section or a section of any other closed geometric shape and are made of non-magnetic stainless steel or any other material capable of withstanding high pressures and corrosion, for example carbon fibre.

The rotor 30 has an annular shape and rotates inside the toroidal tubular body 21 of the stator 20, pushed by a fluid, which is fed under pressure inside the toroidal tubular body 21 of the stator 20.

More specifically, the pressurized fluid enters the stator 20 through at least one inlet duct 25, which is welded at a free end of the first semi-circular tube 21a of the toroidal tubular body 21 and preferably equipped with a perforated end flange 27 and exits from the stator 20 through at least one outlet duct 26, which is welded at a free end of the second semi-circular tube 21b of the toroidal tubular body 21 and preferably provided with a perforated end flange 28.

Figure 1:
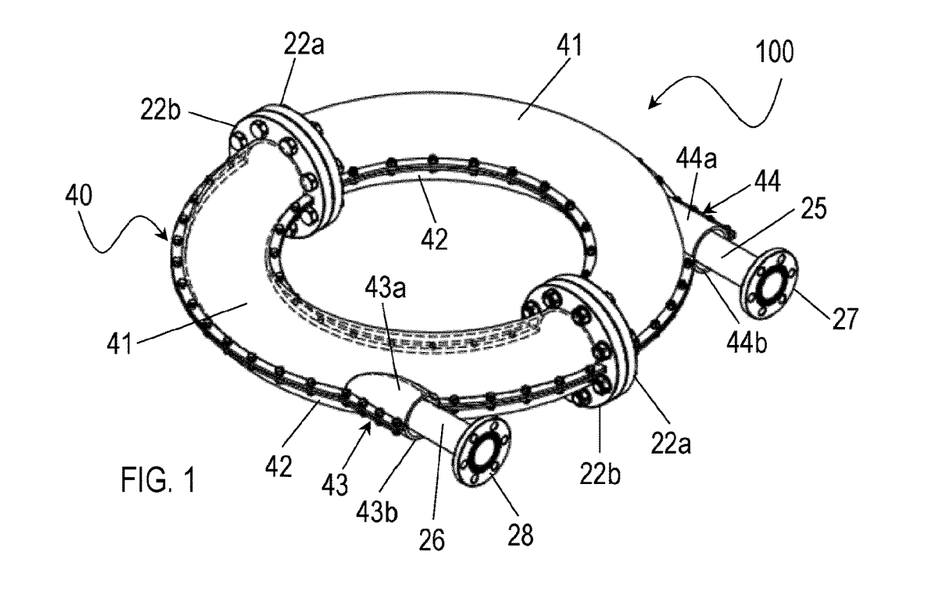
FIG. 1 is a perspective view of a toroidal electric generator according to a first preferred embodiment of the present invention.
Figures 2, 3:
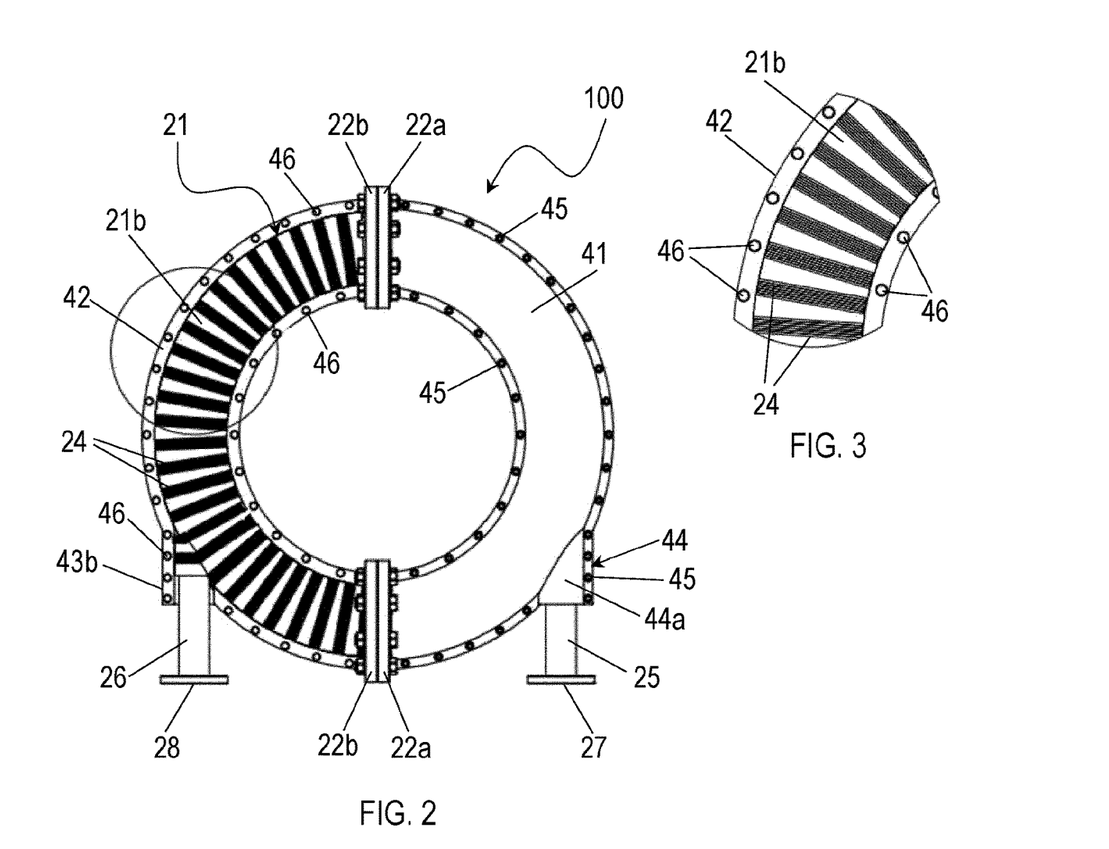
FIG. 2 is a plan view of the toroidal electric generator of FIG. 1, with part of the external casing removed.
FIG. 3 is an enlarged view of the detail circled in FIG. 2.
Figure 4:
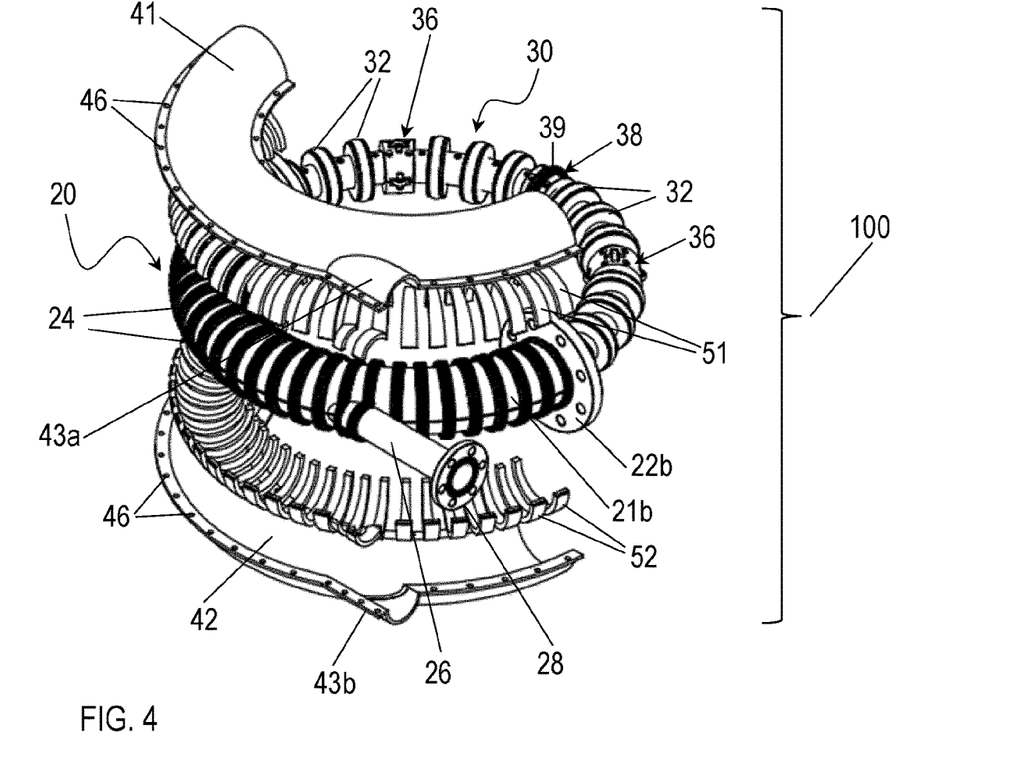
FIG. 4 is a partial exploded view of the toroidal electric generator of FIG. 1.
Figure 5:
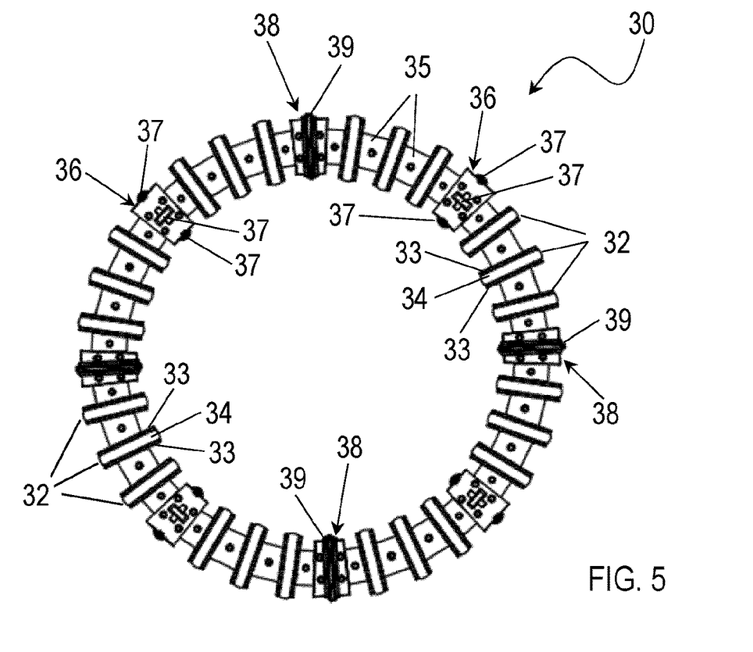
FIG. 5 is a plan view of the toroidal electric generator of FIG. 1.
Figure 6:
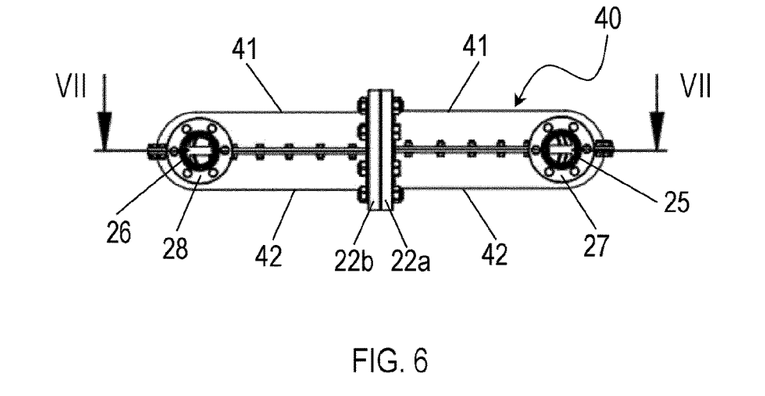
FIG. 6 is a front view of the toroidal electric generator of FIG. 1.
Figure 7:
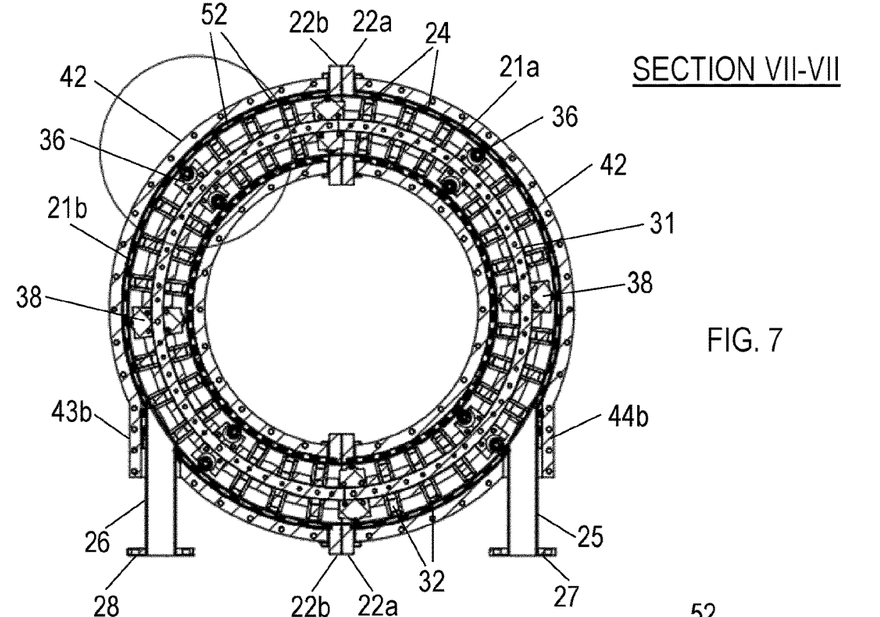
FIG. 7 is a cross-sectional view taken along the line VII-VII of FIG. 6.
Figure 8:
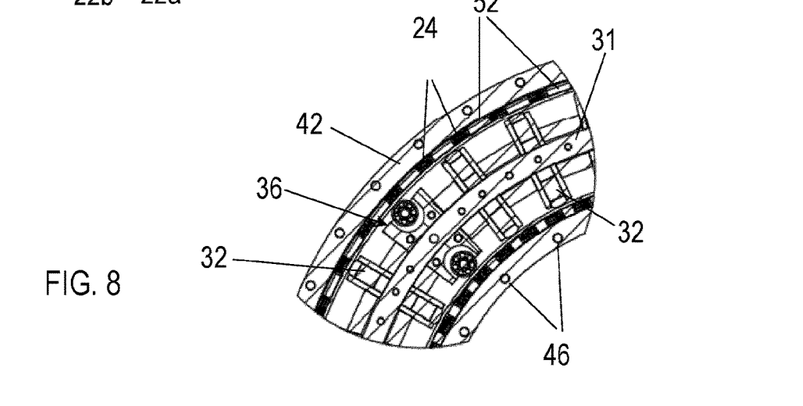
FIG. 8 is an enlarged view of the detail circled in FIG. 7.
Figure 9:
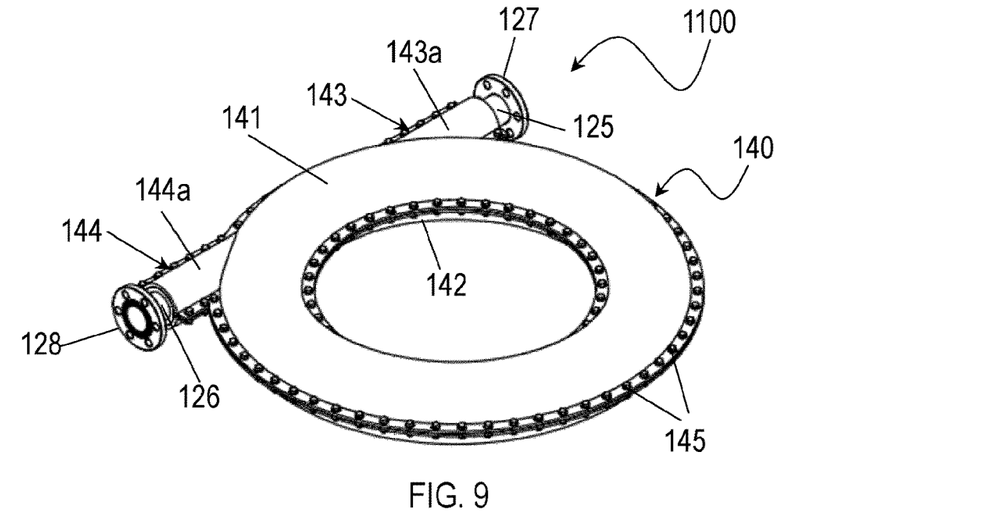
FIG. 9 is a perspective view of a toroidal electric generator according to a second preferred embodiment of the present invention.
Figures 10, 11:
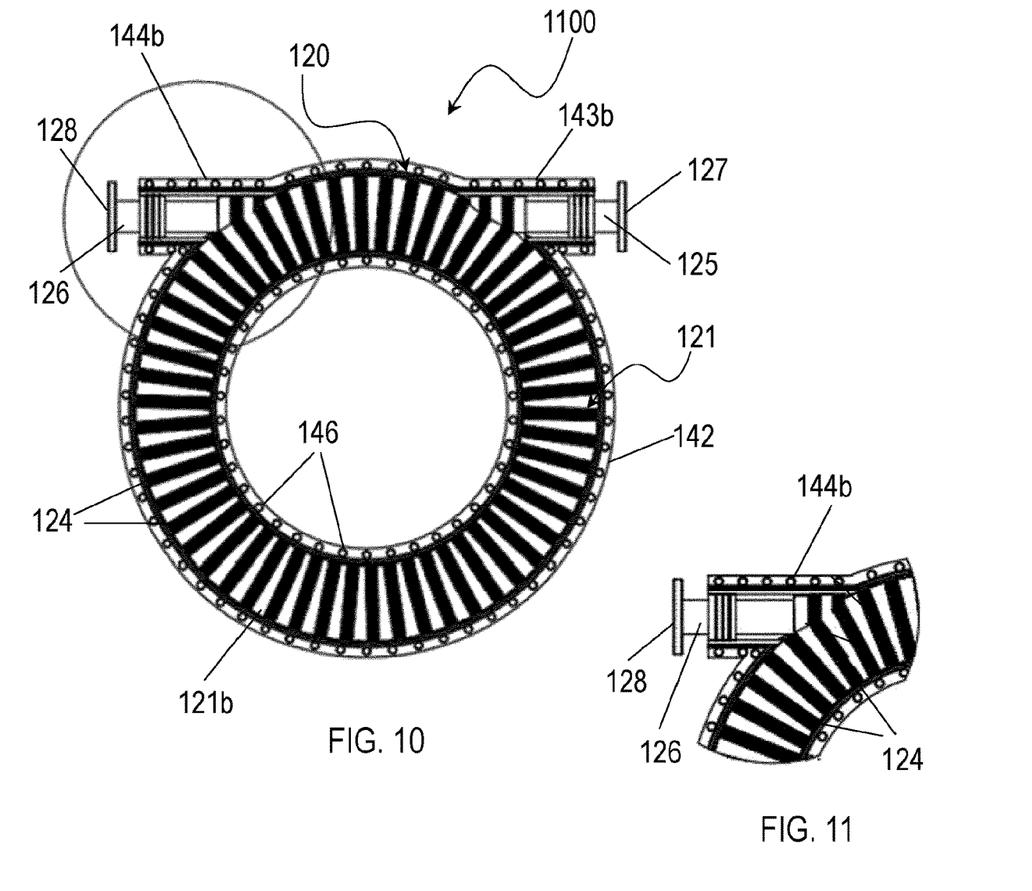
FIG. 10 is a plan view of the toroidal electric generator of FIG. 9, with part of the external casing removed.
FIG. 11 is an enlarged view of the detail circled in FIG. 10.

As shown in detail in FIGS. 5, 7 and 8, the rotor 30 comprises a support element 31 and a plurality of hydraulic blades 32 mounted on the support element 31, integral with it.

Each hydraulic blade 32 comprises a magnet 34, of annular or square shape or of any geometric shape similar to the cross-section of the toroidal tubular body 21, the magnet 34 being covered on the sides by a pair of discs 33 made of metallic or non-magnetic material. The discs 33 protect the respective magnet 34 from impacts against the pressurized fluid entering the stator 20.

To further protect the magnets 34 from corrosion and from impact with the pressurized fluid, a ring, for example made of very resistant plastic material, is preferably provided around each magnet 34. The protection ring has an external diameter equal to or slightly greater than the external diameter of the metal discs 33 and is close to the internal wall of the toroidal tubular body 21 of the stator 20.

The support element 31 of the rotor 30 preferably has a square or circular or triangular section or a section of any other closed geometric shape and preferably consists of two, three or four portions, preferably four portions, which form a ring or circle when they are joined together. Alternatively, the support element 31 has the shape of an open ring.

The hydraulic blades 32 are preferably made of ferro-magnetic material and are twenty-four or more in number and the magnets 34 are made of neodymium or other magnetic or super magnetic material.

To facilitate the assembly and disassembly of the rotor 30 inside the stator 20, magnets (not shown) are provided at respective ends of at least two portions of the support element 31, wherein the magnets form the support element 31 by being joined together through magnetic attraction.

Preferably, the magnets 34 all have polarities directed in the same direction (all North-South or all South-North), so as to induce a positive direct current in the windings 24 of the stator 20. Alternatively, the position of the rotor 30 is inverted inside the stator 20. In this way, a negative direct current is obtained by maintaining the same direction of rotation of the rotor 30.

In yet another alternative embodiment, to obtain alternating electric current by the toroidal electric generator 100, groups of magnets 34, for example three magnets with South-North polarity, are alternated with groups of magnets 34 with opposite polarity, for example three magnets with North-South polarity. In this case, the stator 20 will have a series of windings, one for each group of magnets, with the windings associated with the groups of magnets having the same polarity being electrically connected therebetween.

Furthermore, depending on the number of turns of the windings 24 of the stator 20 and the angular pitch between the magnets 34, the windings 24 can be connected in various known configurations, thereby optimizing the output energy.

The rotor 30 further comprises a series of bearing-holding carriages 36, preferably from a minimum of three to preferably eight bearing-holding carriages 36, which are mounted, for example screwed, on the support element 31.

Each bearing-holding carriage 36 is equipped with at least three, preferably four, bearings 37 positioned externally to the bearing-holding carriage, cross- or "X"-shaped, and tangent to the internal wall of the toroidal tubular body 21 of the stator 20. These bearings 37 keep the rotor 30 centred, allowing it to slide and therefore to rotate inside the stator 20.

The bearing-holding carriages 36 are preferably composed of two parts, preferably the same, in the shape of a semi-cylinder or of the same shape as the internal section of the toroidal tubular body 21 of the stator 20. The two parts comprise an upper part and a lower part, which are coupled together, and to the support element 31 of the rotor 30, by means of a respective locking screw.

The rotor 30 also comprises band-holding carriages 38 mounted, for example screwed, on the support element 31.

Each band-holding carriage 38 externally supports one or more elastic bands 39, which allow the band-holding carriage 38 to slide inside the toroidal tubular body 21 of the stator 20, while keeping all the above described components of the rotor 30 centred. This advantageously increases the compression of the pressurized fluid entering the toroidal electric generator 100, which pushes the rotor 30 to rotate inside the stator 20 without generating dispersions of fluid and pressure, during rotation, between the internal wall of the stator 20 and the elastic bands 39 of the band-holding carriages 38.

The band-holding carriages 38 are preferably composed of two parts, preferably the same, in the shape of a semi-cylinder or of the same shape as the internal section of the toroidal tubular body 21 of the stator 20. The two parts comprise an upper part and a lower part, which are coupled together, and to the support element 31 of the rotor 30, by means of a respective locking screw.

In a different embodiment, depending on the fluid entering the generator 100, all or part of the bearing-holding carriages 36 can be replaced by corresponding band-holding carriages 38.

The rotor 30 further comprises a plurality of spacers 35 mounted, for example screwed, on the support element 31. The spacers 35 are mounted on the support element 31, for example interposed between the hydraulic blades 32, the bearing-holding carriages 36 and/or the band-holding carriages 38. When interposed between two adjacent hydraulic blades 32, the spacers 35 have the purpose of advantageously avoiding the attraction between the hydraulic blades 32, and therefore the union of one with the other, while preventing the pressure and thrust received by each hydraulic blade 32 to be discharged onto a support element (not shown) which blocks the hydraulic blade 32 on the support element 31 of the rotor 30.

Thanks to its configuration, the toroidal electric generator 100 according to the present invention is of the reversible type. In other words, by applying electrical energy to the windings 24 of the stator 20, an electromotive force is induced in the magnets 34 of the hydraulic blades 32 of the rotor 30, which causes the rotor 30 to rotate, with consequent suction or compression of the fluid. In this case the toroidal electric generator 100 will behave like a compressor or a high-pressure hydraulic pump.

Preferably, at the inlet duct 25 of the stator 20 there is mounted an inlet valve (not shown) adapted to control the quantity of the fluid entering the toroidal electric generator 100. Alternatively, i.e. when the generator 100 is used as a compressor, the inlet valve will behave like a non-return valve, causing the fluid not to re-enter the electric generator 100, but forcing it to exit, compressed, from the outlet duct 26 of the stator 20.

The toroidal electric generator 100 further comprises an external casing 40, preferably annular in shape with a circular or square section, made of metal material, preferably iron, which comprises an upper half-shell 41 and a lower half-shell 42. The upper and lower half-shells 41, 42 are coupled therebetween by mechanical means, for example screwed with screws 45 passing through respective openings 46 provided at edge portions of the half-shells, thereby hermetically closing the toroidal electric generator 100 inside them.

The upper half-shell 41 is formed by two equal portions, which, in the assembled condition, cover the toroidal electric generator 100, in particular the stator 20, at the top, with respective terminal ends abutting against the perforated flanges 22a and 22b for coupling the first and second half-tubes 21a, 21b of the stator 20. Similarly, the lower half-shell 42 is formed by two equal portions, which, in assembled condition, cover the toroidal electric generator 100, in particular the stator 20, at the bottom, with respective terminal ends abutting against the perforated flanges 22a and 22b for coupling the first and second half-tubes 21a, 21b of the stator 20.

Each portion of the upper half-shell 41 and of the lower half-shell 42 ends with a respective half-tube-shaped element, respectively 43a, 43b and 44a, 44b, which, in the assembled condition, form a first tube 44 for housing the inlet duct 25 of the stator 20 and a second tube 43 for housing the outlet duct 26 of the stator 20.

The toroidal electric generator 100 further comprises a plurality of upper separating elements 51 and a plurality of lower separating elements 52, with a semi-circular or semi-square shape depending on the shape of the outer casing 40, and all made of metallic material, for example iron.

Preferably, the upper separating elements 51 are joined together to form an upper half-ring of separating elements and the lower separating elements 52 are joined together to form a lower half-ring of separating elements.

In the assembled condition of the generator, the upper separating elements 51 are sandwiched between the upper half-shell 41 of the outer casing 40 and the upper half of the toroidal tubular body 21 of the stator 20, in contact with them, and positioned between pairs of adjacent windings 24 of the stator 20.

In the assembled condition of the generator, the lower separation elements 52 are sandwiched between the lower half-shell 42 of the outer casing 40 and the lower half of the toroidal tubular body 21 of the stator 20, in contact with them, and positioned between pairs of adjacent windings 24 of the stator 20.

As previously mentioned, the presence of the external casing 40 and of the plurality of separating elements 51 and 52 between adjacent windings 24, closes the circuit of the magnetic flux generated by the magnets of the hydraulic blades as they pass inside each winding, thereby eliminating or considerably reducing the dispersion phenomena of the magnetic field generated by the magnets 34 of the hydraulic blades 32 of the rotor 30 rotating inside the stator 20. This advantageously increases the quantity of electrical energy generated and the efficiency of the toroidal electric generator 100. Furthermore, the external casing advantageously allows the toroidal electric generator, in particular the stator windings, to be protected from external impacts and stresses.

With reference to FIGS. 9 to 15, they show a toroidal electric generator according to a second preferred embodiment of the present invention.

The toroidal electric generator, indicated in general by the reference number 1100, is similar to the toroidal electric generator 100 described above with reference to FIGS. 1 to 8, from which it differs for the different configuration of the outer casing and of the toroidal tubular body of the stator.

The toroidal electric generator 1100 thus comprises a stator 120 and a rotor 130 rotatable inside the stator 120.

The stator 120 comprises a toroidal tubular body 121 on an external surface of which a plurality of windings or coils 124 made of conductor wire is provided. Preferably, between the outer surface of the toroidal tubular body 121 of the stator 120 and the windings 124 a layer of insulating material (not shown) is provided.

In the embodiment shown in FIGS. 9 to 15, the toroidal tubular body 121 of the stator 120 consists of an upper annular half-tube 121a and a lower annular half-tube 121b, which are coupled together with known means, for example by welding, by means of a sealant and/or wrapped with a carbon fibre or fibreglass. A gasket (not shown) is preferably interposed between the upper annular half-tube 121*a* and the lower annular half-tube 121*b*.

The toroidal tubular body 121 comprises at least one duct 125 for the inlet, in the stator 120, of a pressurized fluid and at least one duct 126 for the outlet, from the stator 120, of the pressurized fluid. The inlet duct 125 and the outlet duct 126 have a respective end flange 127 and 128.

Once assembled, the toroidal tubular body 121 preferably has a circular or square section or a section of any other closed geometric shape and is made of non-magnetic stainless steel or any other material capable of withstanding high pressures and corrosion, for example carbon fibre. In a completely similar way to the rotor 30 of the toroidal electric generator 100, the rotor 130 comprises a support element 131 and a plurality of hydraulic blades 132, mounted on the support element 131, integral with it.

Each hydraulic blade 132 comprises an annular magnet 134 (see FIG. 15), having a section equal to the internal section of the toroidal tubular body 121 of the stator 120, the magnet 134 being covered on the sides by a pair of discs 133 of metallic or non-magnetic material (see FIG. 15), which protect the respective magnet 134 from impacts against the pressurized fluid entering the stator 120.

The support element 131 of the rotor 130 preferably has a square or circular section, or any other closed geometric shape, and is preferably constituted by two, three or four portions, preferably by four portions, which are joined together to form a ring or circle. Alternatively, the support element 31 has the shape of an open ring.

The hydraulic blades 132 are preferably made of ferromagnetic material and are twenty-four or more in number and the magnets 134 are made of neodymium or other magnetic or super magnetic material.

To facilitate the assembly and disassembly of the rotor 130 inside the stator 120, magnets (not shown) are provided at respective ends of at least two portions of the support element 131, wherein the magnets form the support element 131 by being joined together through magnetic attraction.

The rotor 130 also preferably comprises a series of bearing-holding carriages 136, a series of band-holding carriages 138 and/or spacers 135, which are the same as those described with reference to FIGS. 1 to 8, and therefore they are not further described here.

The toroidal electric generator 1100 further comprises an external casing 140, preferably of an annular shape with a circular or square section or a section of any other closed geometric shape, made of metallic material, preferably iron.

The external casing 140 comprises an upper half-shell 141 and a lower half-shell 142 coupled together, for example screwed with screws 145 passing through respective openings 146 provided at edge portions, thereby hermetically closing the toroidal electric generator 100 inside them.

The upper half-shell 141 and the lower half-shell 142 have a pair of terminal portions in the shape of a half-tube, respectively 143*a*. 144*a* and 143*b*, 144*b*, which, in the assembled condition, form a first tube 144 for housing the inlet duct 125 of the stator 120 and a second tube 143 for housing the outlet duct 126 of the stator 120.

Figure 12:
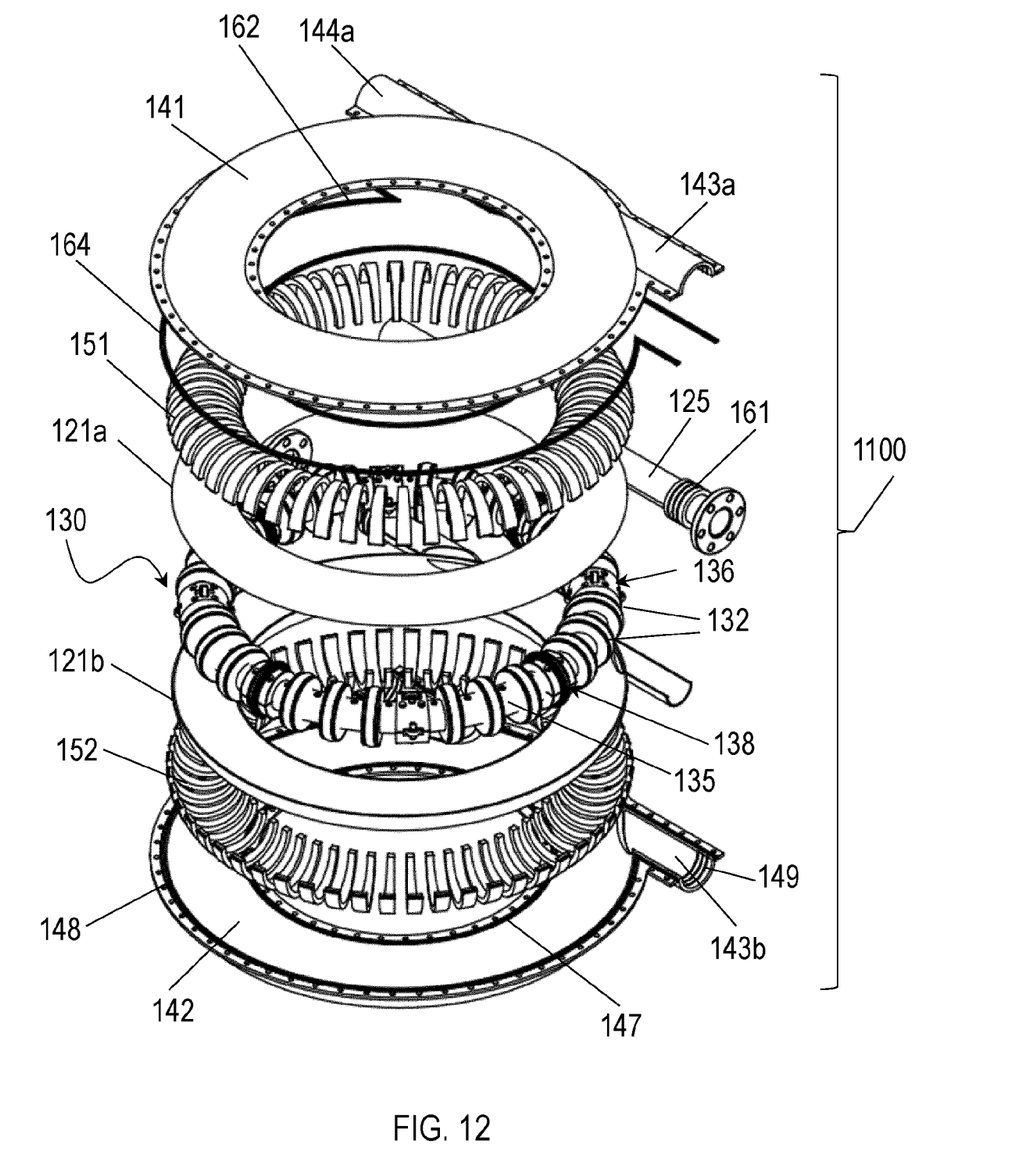
FIG. 12 is an exploded view of the toroidal electric generator of FIG. 9.
Figure 13:
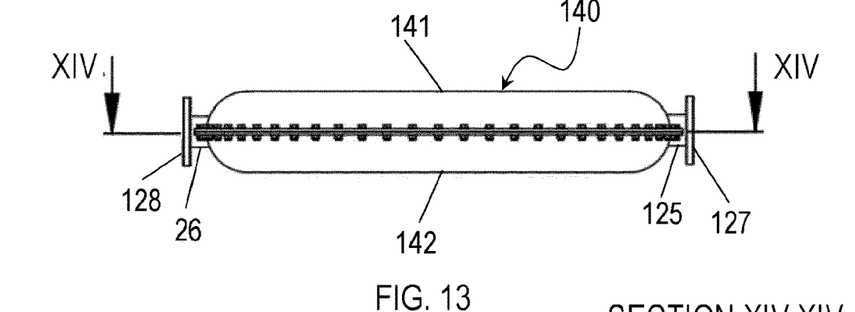
FIG. 13 is a front view of the toroidal electric generator of FIG. 9.
Figure 14:
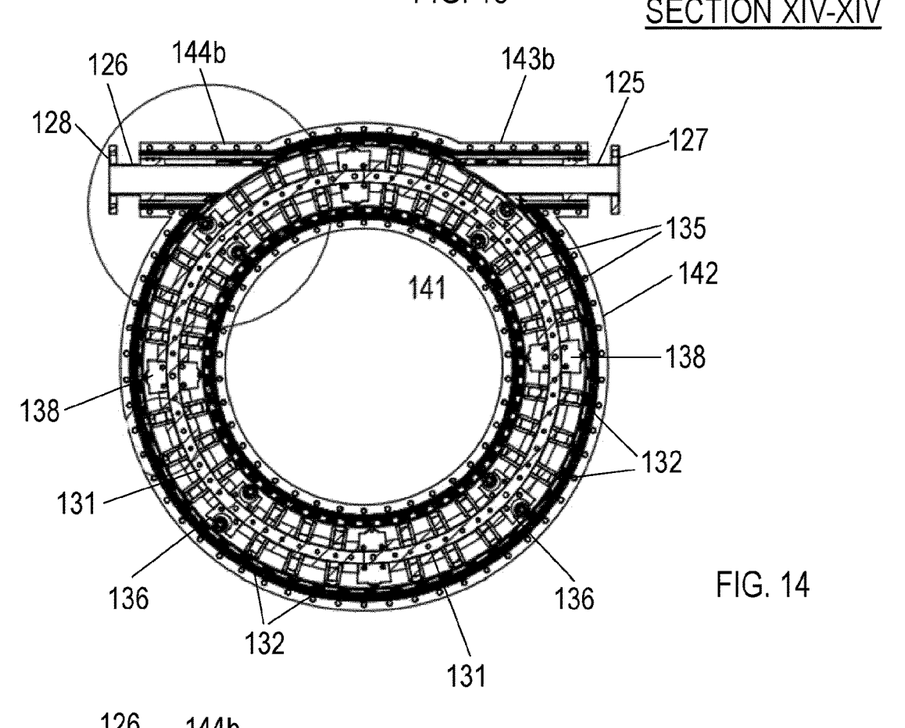
FIG. 14 is a cross-sectional view taken along the line XIV-XIV of FIG. 13.
Figure 15:
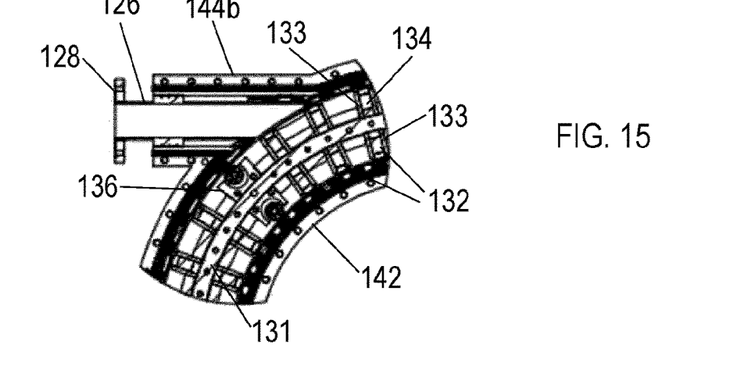
FIG. 15 is an enlarged view of the detail circled in FIG. 14.

As can be seen in FIG. 12, the external casing 140 further comprises a pair of gaskets 162, 164 housed in respective annular seats 147, 148 formed at the external diameter and the internal diameter of the upper 141 or lower half-shell 142 and the respective end portions 143*a*. 144*a* or 143*b*, 144*b* thereof.

One or more gaskets 161 are further provided on the inlet 125 and outlet ducts 126 of the stator 120, preferably in proximity to the perforated flanges 127, 128. The gasket(s) are housed in respective seats 149 formed in end portions 143*a*, 144*a* and 143*b*, 144*b* of the upper 141 and lower half-shells 142 of the outer casing 140.

The toroidal electric generator 1100 further comprises a plurality of upper separating elements 151 and a plurality of lower separating elements 152, all made of metallic material, for example iron.

Preferably, the upper separating elements 151 are joined together to form an upper half-ring of separating elements and the lower separating elements 152 are joined together to form a lower half-ring of separating elements.

In the assembled condition of the generator, the upper separating elements 151 are sandwiched between the upper half-shell 141 and the upper half-tube 121*a* of the toroidal tubular body 121 of the stator 120, in contact with them, and positioned between two adjacent windings 124.

In the assembled condition of the generator, the lower separating elements 152 are sandwiched between the lower half-shell 142 and the lower half-tube 121*b* of the toroidal tubular body 121 of the stator 120, in contact with them, and positioned between two adjacent windings 124.

As previously mentioned, the presence of the external casing 140 and of the plurality of separating elements 151 and 152 between adjacent windings 124, closes the circuit of the magnetic flux generated by the magnets of the hydraulic blades as they pass inside each winding, thereby eliminating or considerably reducing the dispersion phenomena of the magnetic field generated the hydraulic blades 132 of the rotor 130 rotating inside the stator 120. This advantageously increases the quantity of electrical energy generated and the efficiency of the toroidal electric generator 1100. Furthermore, the external casing advantageously allows the toroidal electric generator, in particular the stator windings, to be protected from external impacts and stresses.

Figure 16:
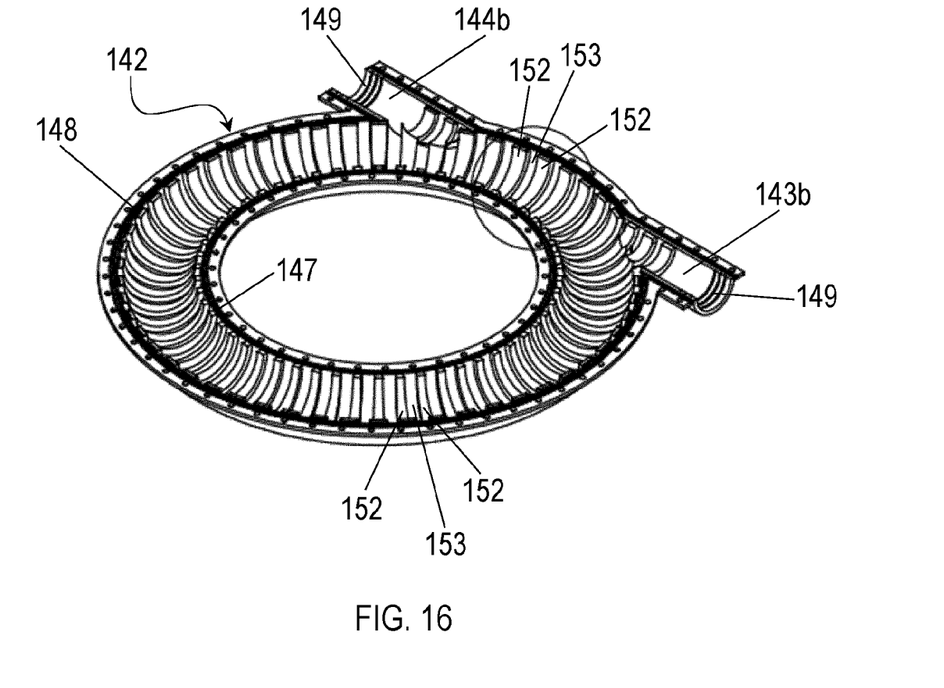
FIG. 16 is a partial perspective view of a variant of the external casing of the toroidal electric generator of the invention.
Figure 17:
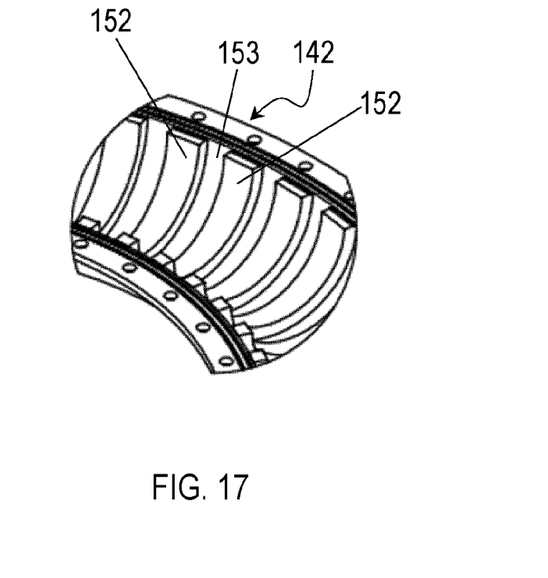
FIG. 17 is an enlarged view of the detail circled in FIG. 16.

With reference to FIGS. 16 and 17, they show a variant of the external casing of the toroidal electric generator according to the invention. This variant is described with reference to the external casing 140, but it is equally applicable to the external casing 40 described with reference to FIGS. 1 to 8.

In particular, the upper and lower separating elements 151 and 152, instead of being separate elements, are formed in a single body with the upper half-shell 141 and the lower half-shell 142 of the external casing 140, by making cavities 153 in the two half-shells, one for each winding 24 of the stator 20. The separating elements are constituted by side walls, preferably arcuated, of the cavities.

The operation of the toroidal electric generator according to the alternative embodiments of the present invention will now be described with reference to the embodiment of FIGS. 1 to 8, but it is understood that what is set out below applies to the toroidal electric generator 1100 in accordance with the second embodiment.

In a first operating condition, the inlet valve of the inlet duct 25 is open, so that the pressurized fluid enters the stator 20 and impacts substantially perpendicularly on the hydraulic blades 32 of the rotor 30. The rotor 30 begins to rotate inside the stator 20 with consequent generation of a rotating magnetic field by means of the magnets 34 of the hydraulic blades 32. The magnetic field generated by the magnets 34 induces a large amount of electrical energy in the windings 24 of the stator. The fluid exits from the stator 20 through the outlet duct 26 at reduced pressure, having yielded it to the rotor 30 in the form of a thrust force.

Since the toroidal electric generator is of the reversible type, in a second operating condition it can operate as a high-pressure pump or a compressor for a fluid, such as for example air or water.

In this case, electrical energy is applied to the ends of the windings 24 and the electromotive force that is generated attracts the magnets 34, rotating the hydraulic blades 32 in the direction of the electric current that passes inside the windings 24, and causing the rotor 30 to rotate inside the stator 20. The fluid is then re-directed inside the stator 20 through the inlet duct 25, where there is a non-return valve, which prevents the fluid from returning back from where it is entered. The rotor 30, rotating very quickly, compresses the fluid and pushes it out with force through the outlet duct 26 of the stator 20, where there is another non-return valve, which prevents the fluid from returning back inside the stator 20. The toroidal electric generator 100 therefore behaves like a compressor or a high-pressure pump.

From the above description the characteristics of the toroidal electric generator of the present invention are evident, as are the relative advantages. In particular, the toroidal electric generator has increased efficiency and is configured to resist, without being damaged, the high pressures of the fluid entering the stator. Furthermore, the toroidal electric generator can be replaced quickly, without interrupting the correct performance of work activities for a long time and its maintenance and/or replacement of parts are simple and immediate.

Finally, it is clear that the toroidal electric generator thus conceived is susceptible of numerous modifications and variations; moreover, all the details can be replaced by technically equivalent elements.

The invention claimed is:

1. A toroidal electric generator comprising:
    a stator, which includes a tubular body supporting a plurality of windings;
    a rotor rotatable within the stator and comprising a support element and a plurality of hydraulic blades, each provided with a respective magnet and mounted on the support element integral with respect there to;
    an external casing; and
    a plurality of separating elements, each separating element being arranged between a respective pair of adjacent windings of the plurality of windings of the stator.

2. The toroidal electric generator of claim 1, wherein the external casing comprises an upper half-shell and a lower half-shell, which are coupled there between to hermetically enclose the toroidal electric generator there within.

3. The toroidal electric generator of claim 2, wherein the upper half-shell and the lower half-shell have terminal portions in the shape of a half-duct, which, in an assembled condition, form a first duct configured to house an inlet duct of the stator and a second duct configured to house an outlet duct of the stator.

4. The toroidal electric generator of claim 3, wherein gaskets are interposed between the upper half-shell and the lower half-shell, the gaskets being housed in respective annular seats formed at an external diameter and an internal diameter of the upper or lower half-shell and their respective terminal portions.

5. The toroidal electric generator of claim 2, wherein the upper half-shell is formed by two equal portions, which, in an assembled condition, cover the stator at a top thereof, and the lower half-shell is formed by two equal portions, which, in the assembled condition, cover the stator at a bottom thereof.

6. The toroidal electric generator of claim 1, wherein the plurality of separating elements comprise upper separating elements and lower separating elements, which are connected there between to form an upper half-ring and a lower half-ring.

7. The toroidal electric generator of claim 2, wherein the upper and lower separating elements are formed in a single body with the upper half-shell and the lower half-shell of the external casing, by forming cavities in the upper and lower half-shells, one cavity for each winding of the stator, the separating elements comprising side walls of the cavities.

8. The toroidal electric generator of claim 7, wherein the side walls are arcuated.

9. The toroidal electric generator of claim 1, wherein the rotor further comprises a plurality of bearing-holding carriages and a plurality of band-holding carriages, each bearing-holding carriage and each band-holding carriage being mounted on the support element.

10. The toroidal electric generator of claim 1, wherein the rotor further comprises a series of spacers which are mounted on the support element between the hydraulic blades, the bearing-holding carriages, and/or the band-holding carriages.

11. The toroidal electric generator of claim 1, wherein the tubular body of the stator comprises an upper half-duct and a lower half-duct coupled there between.

12. The toroidal electric generator of claim 1, wherein the hydraulic blades further comprise a pair of disks configured to laterally protect the respective magnet.

13. The toroidal electric generator of claim 12, wherein the magnets and the disks of the hydraulic blades are of a closed and internally perforated shape.

14. The toroidal electric generator of claim 13, wherein the magnets and the disks of the hydraulic blades are square-shaped.

* * * * *